G. W. BRADY.
CAR-COUPLING.

No. 171,763. Patented Jan. 4, 1876.

Witnesses,
Harry Howson.
Harry Smith

Gordon W. Brady
by his Attorneys
Howson & Son.

UNITED STATES PATENT OFFICE.

GORDON W. BRADY, OF ATHENS, NEW YORK, ASSIGNOR TO HIMSELF AND IRA COOPER, OF SAME PLACE.

IMPROVEMENT IN CAR-COUPLINGS.

Specification forming part of Letters Patent No. 171,763, dated January 4, 1876; application filed September 29, 1875.

*To all whom it may concern:*

Be it known that I, GORDON W. BRADY, of Athens, Greene county, New York, have invented certain Improvements in Car-Couplings, of which the following is a specification:

My invention relates to that class of car-couplings in which a dog hinged to the coupling-block will yield on the introduction of the link, and will retain the latter until the dog is elevated; and the objects of my invention are to so form the chamber of the block for the reception of the link that the latter, when in the chamber, will occupy a horizontal position; and to afford facilities for the easy discharge of snow, ice, and other matter from the link-chamber of the block.

These objects I attain in the manner which I will now proceed to describe, reference being had to the accompanying drawing, in which—

Figure 1:
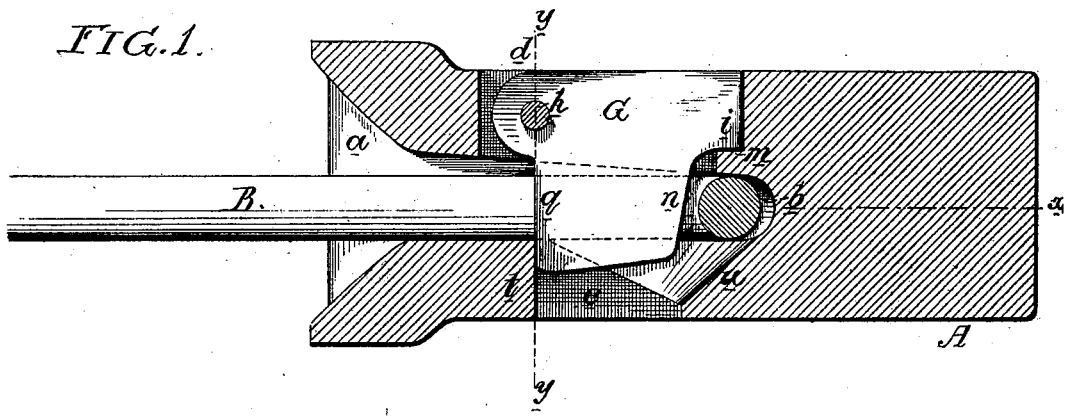
Figure 2:
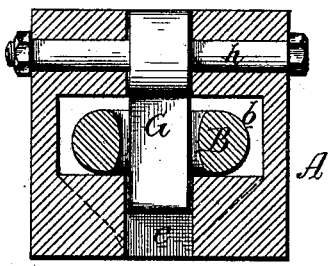
Figure 3:
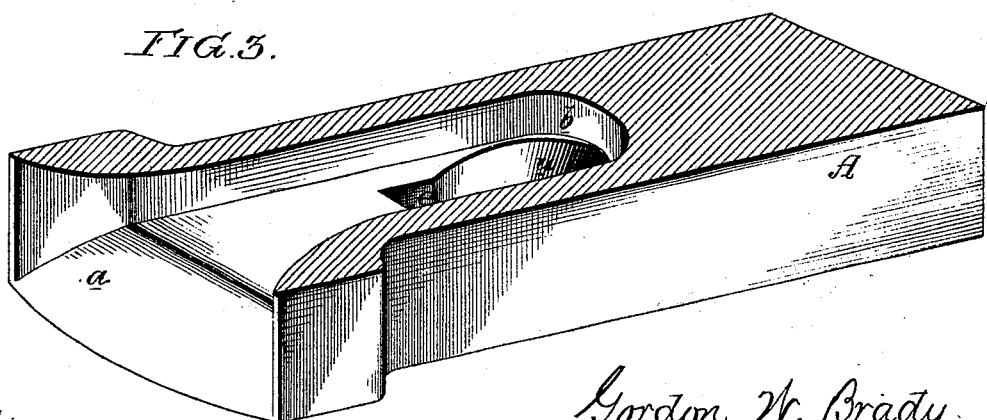

Figure 1 is a vertical section of my improved car-coupling; Fig. 2, a transverse vertical section on the line $y\ y$; and Fig. 3, a sectional perspective view of the coupling-block.

This block A may be made in one piece, or of two parts, united on the dotted line $x$. At the front of the block is the usual flaring entrance $a$ to the recess or chamber $b$, which is of sufficient width to freely admit the link B. The chamber, however, is deeper at its front end, where it communicates with the flaring entrance, than at the rear end, where it is but little deeper than the link is thick, the chamber being thus tapered by making its top inclined and bottom horizontal, as shown, so that, while the chamber is deep enough at its entrance to freely receive the link, the latter, when pushed into the said chamber, must assume the horizontal position best adapted for the free entrance of the outer end of the link into the coupling-block of the adjoining car. In the upper portion of the block there is an opening, $d$, for receiving the dog G, which is hung loosely to a pin, $h$, passing through the block, which can be elevated and lowered by a chain attached to the outer end of the dog. The dog is of the peculiar shape shown in the drawing, having a lip, $i$, for bearing on a shoulder, $m$, on the block, a bearing, $n$, for the link, and an edge, $q$, for bearing against the front end $t$ of the lower opening $e$ of the block.

It is important that the chamber $b$ of the block should always be free from ice, snow, or accumulations of other matter which may interfere with the free introduction of the link into the block, or may tend to impair the said link. Hence I make the interior of the opening $e$ beveled upward and outward, the rear end of the opening being inclined, as shown, from the extreme end of the chamber $b$, and the sides of the opening being inclined, as shown by dotted lines in Fig. 2, excepting at the part $e$, where they receive the dog.

The flaring sides and ends of the opening afford a free exit for any matter which might otherwise be lodged in the chamber $b$, the introduction of the link into the chamber tending to fracture and force out ice which may accumulate in the same.

I claim as my invention—

1. The combination of the link B with the chamber $b$ of the block, said chamber being at its inner end as deep as, or slightly deeper than, the link is thick, and made deeper toward the flaring entrance $a$ of the chamber, as set forth, for the purpose specified.

2. The opening $e$ in the block, having flaring side and ends, as and for the purpose described.

In testimony whereof I have signed my name to this specification in the presence of two subscribing witnesses.

GORDON W. BRADY.

Witnesses:
 JOEL A. COOPER,
 SAML. H. NICHOL.